(12) United States Patent
Groneberg-Nienstedt

(10) Patent No.: US 7,040,976 B2
(45) Date of Patent: May 9, 2006

(54) METHOD OF PORTIONING MEAT

(75) Inventor: Petra Groneberg-Nienstedt, Düsseldorf (DE)

(73) Assignee: Nienstedt GmbH, Haltern (DE)

(*) Notice: Subject to any disclaimer, the term of this patent is extended or adjusted under 35 U.S.C. 154(b) by 0 days.

(21) Appl. No.: 10/863,811

(22) Filed: Jun. 8, 2004

(65) Prior Publication Data
US 2005/0282482 A1 Dec. 22, 2005

(51) Int. Cl.
A22C 25/14 (2006.01)
(52) U.S. Cl. .................................................. 452/174
(58) Field of Classification Search ..................... None
See application file for complete search history.

(56) References Cited

U.S. PATENT DOCUMENTS

| 3,691,594 | A | 9/1972 | Klein | 425/572 |
| 3,756,231 | A | 9/1973 | Ross | 100/232 |
| 3,852,507 | A | 12/1974 | Toby | 426/513 |
| 3,863,020 | A | 1/1975 | Robinson | 426/513 |
| 3,913,175 | A | 10/1975 | Peterson | 426/513 |
| 4,106,162 | A | 8/1978 | Fournier | 425/298 |
| 4,192,899 | A | 3/1980 | Roth | 426/513 |
| 4,193,272 | A | 3/1980 | Bernard | 62/320 |
| 4,276,318 | A | 6/1981 | Orlowski et al. | 426/513 |
| 5,037,350 | A | 8/1991 | Richardson et al. | 452/174 |
| 5,958,487 | A | 9/1999 | Emberger et al. | 426/129 |

Primary Examiner—Thomas Price
(74) Attorney, Agent, or Firm—Andrew Wilford

(57) ABSTRACT

A method of portioning meat which utilizes a press in which a piece of meat is shaped and a final form is imparted to the portion by stamping. In one embodiment the excess meat around a shaped portion is cut away by the stamping. In another, the piece of meat following the pressing is cut into strips. In both cases, the press ram is brought to a given spacing from the bottom press member to ensure that the pieces of meat will be pressed to the same thickness in succeeding press cycles.

17 Claims, 2 Drawing Sheets

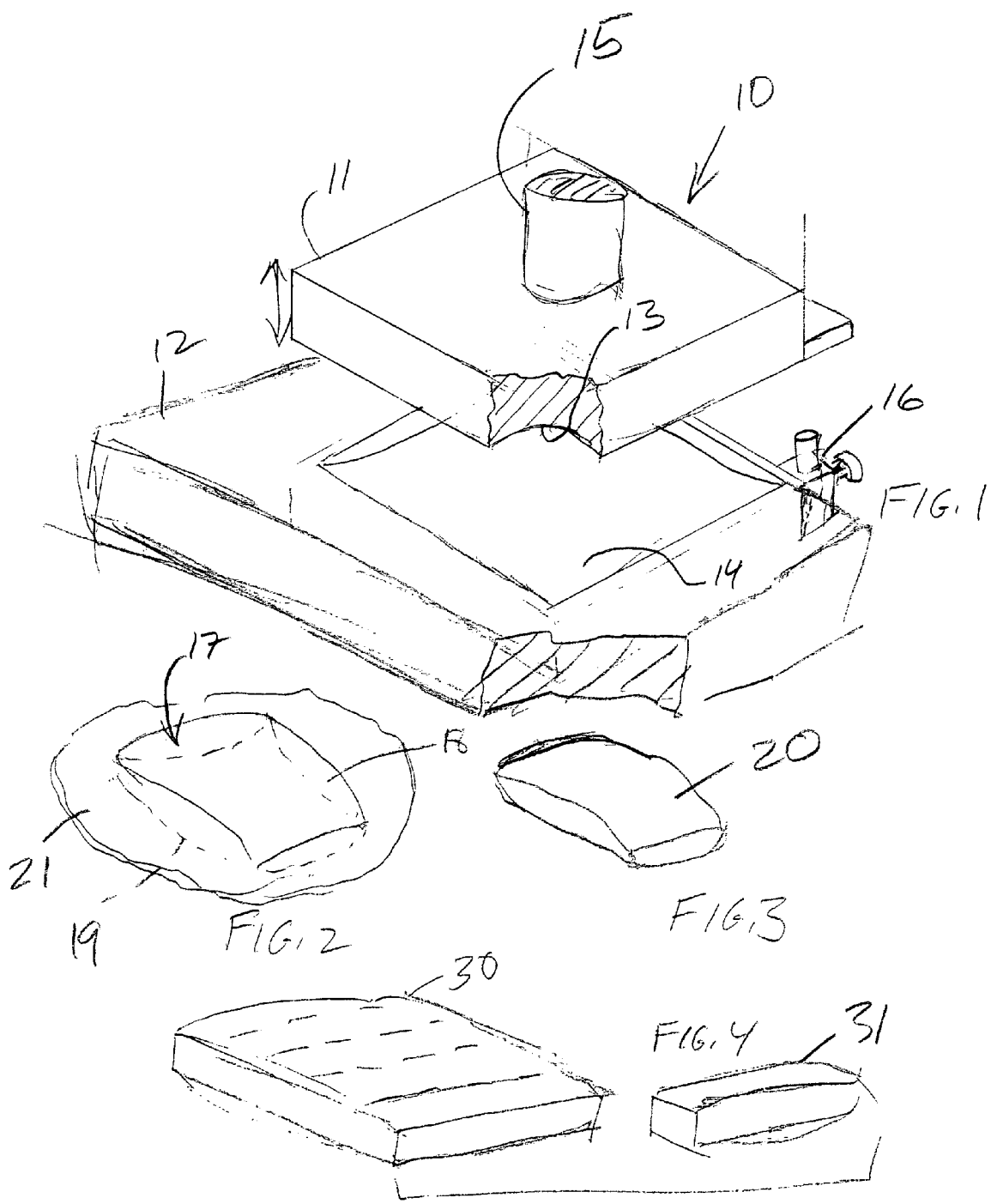

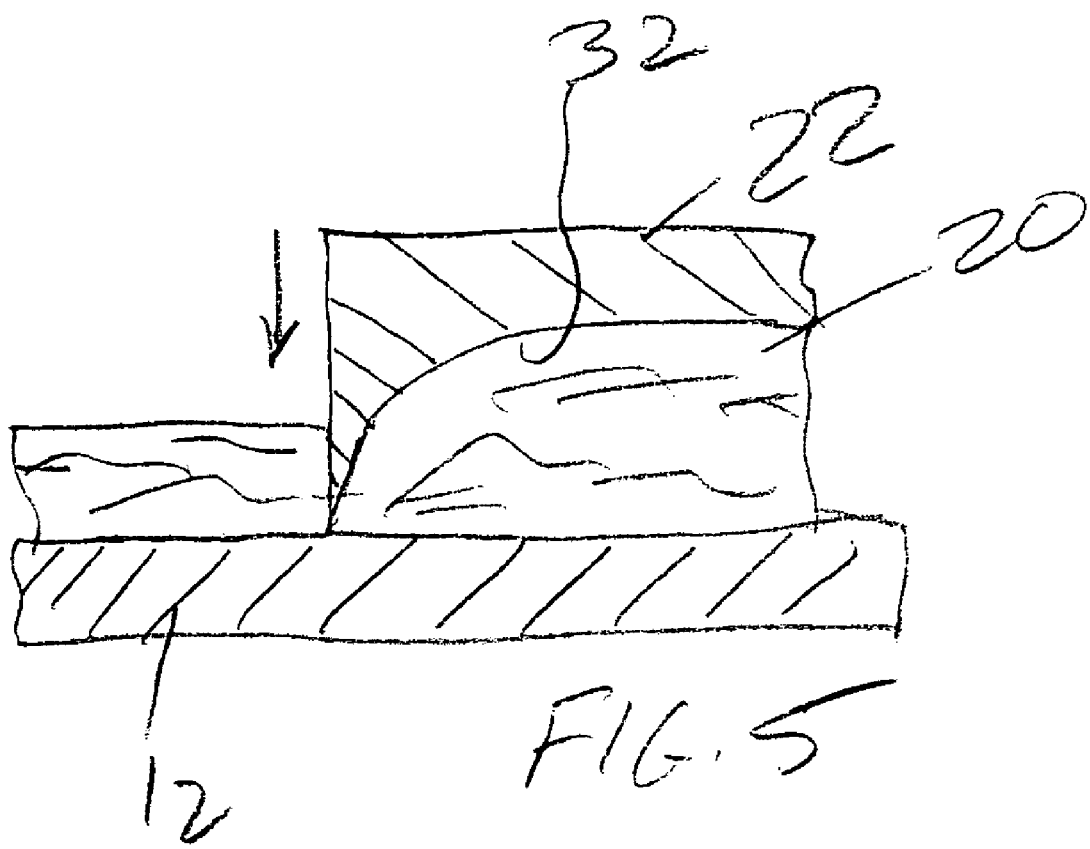

METHOD OF PORTIONING MEAT

FIELD OF THE INVENTION

My present invention relates to a method of portioning meat in a press and particularly by pressing a piece of meat between an upper tool which can form part of a ram and a lower tool supporting the meat against the upper tool and wherein the tool may form dies shaping the portion to be produced. More particularly the invention relates to the portioning of meat between a lower die and a ram or stamping tool.

BACKGROUND OF THE INVENTION

In the food industry it is of increasing importance to be able to provide portions of meat which have substantially identical weights per portion and substantially identical shapes and hence substantially the same thicknesses and cross sections. Portions of meat which are thus practically identical enable automatic cooking and the simultaneous cooking of many pieces of meat. It also enables simplified packaging of cooked and uncooked meat products.

The uniformity of the portions, especially in the case of finished or fully cooked products enables the presentation of the portions on a plate to have an esthetic appearance and in general the shaping of meat products which can originally be obtained with a variety of configurations, enables the overall appearance of the processed meat to be greatly improved.

It is known to roll pieces of meat in a nonfrozen state and then to cut up the rolled product, especially by a water jet cutter, to portion the meat and impart a desired shape to the portions.

It is also known to place pieces of meat, usually by vacuum, into a trough-shaped form and to cut off those parts of the meat which project horizontally beyond the form and thereby shape individual portions of meat. Both of these processes, however, while they do impart a given shape to the meat, are incapable of satisfactorily providing identical-shape, shape-stable and equal height and weight end products. In addition, in processes which involve the rolling of pieces of meat, it is found that the meat is excessively stressed and a tearing of the flesh can occur.

It is also known to shape pieces of meat in a frozen state in a press using a press ram which compresses the meat until a particular pressure is obtained.

The result is that certain portions of the meat may have different thicknesses or heights and different dimensions so that the portions which are thus formed by compression to equal pressures frequently are not of equal weight.

In another process a piece of meat can be shaped in its frozen state by compression with a press ram in a trough-shaped mold to a defined height, to yield a piece of meat with a defined weight but different shape. A problem with this system, however, is that excess material from a starting piece of meat of higher weight than the portion to be made, is pressed outwardly in an uncontrolled manner and frequently remains as an undesired projection on the reshaped product.

OBJECTS OF THE INVENTION

It is, therefore, the principal object of the present invention to so improve on the prior techniques described so that at comparatively low cost and with little additional equipment and with less stress or damage to the meat products, highly exact equal weight and uniformly shaped pieces of meat can be produced.

It is therefore an object of the invention to provide a method of portioning meat which is capable of producing a multiplicity of meat portions of substantially identical size, shape and weight without the drawbacks of the earlier methods described. Moreover, there is the requirement to optically design the finished meat portions such that they look big when being presented on a plate.

SUMMARY OF THE INVENTION

These objects are achieved in accordance with the invention by a method of portioning meat which comprises the steps of:

(a) pressing a piece of frozen meat of a size greater than that of a portion to be made between an upper die and a lower die defining between them the shape and dimensions of a predetermined meat portion by relatively displacing the dies in a press with the piece of meat between them until a predetermined exact spacing between the dies is obtained;

(b) thereafter cutting out the meat from the portion shaped; and (c) repeating steps (a) and (b) to produce a multiplicity of meat portions of substantially identical shape and size by maintaining the exact spacing the same for a given series of meat portions.

With this method a frozen piece of meat of a greater weight than that of the desired meat portion or end product is placed between upper and lower tools of a shaping press and to produce a series of same-size meat portions of equal weight, the upper and lower tool by operation of the press are displaced relatively toward one another to exactly the same spacing and then the compressed meat layer, all of identical thickness, are cut along the peripheries of predetermined meat portions to define the respective peripheral shapes and dimensions, especially in a stamping process.

With this technique it is possible to produce meat portions of identical shapes and identical weights without excessively stressing the meat or fibers thereof. The equipment used for this purpose is structurally simple and can be operated with high cycling rates or short cycling time.

So that each portion of the meat will have a convex or rounded side, as is desirable for portion appearance, the lower tool can have the configuration of a shaping trough or die with a complementary configuration. The upper tool or the underside of the ram can likewise have a trough shape, i.e. can be concave so as to shape a convex portion side at the top as well. Advantageously, the edges of both troughs are mutually aligned.

This method is especially suitable when each meat portion is formed from a single piece, or is to constitute a single piece corresponding to the piece of meat originally used.

In an alternative, however, for producing strips of meat of the same height and same width, a piece of meat of greater weight than the desired end products is placed between the upper and lower press members and is pressed so that at the conclusion of the pressing portion, there is exactly the same spacing between these members for the production of a series of such portions from a plurality of pieces of meat. Thereafter, the layers of meat which result from the pressing to the same spacing of the press members are cut into meat portion strips, especially by a stamping process.

The method can thus comprise the steps of:

(a) pressing a piece of frozen meat of a size greater than that of a portion to be made between an upper die and a lower die defining between them the shape and dimensions of a predetermined meat portion by relatively displacing the dies in a press with the piece of meat between them until a predetermined exact spacing between the dies is obtained, thereby forming a layer of meat of a predetermined thickness;

(b) thereafter cutting from the layer of meat strips of the same or different widths to produce strip-shaped portions; and (c) repeating steps (a) and (b) to produce a multiplicity of meat portions of substantially identical thickness by maintaining the exact spacing the same for a given series of meat portions.

The meat which can be used in accordance with the present invention can be any meat which can be pressed in a frozen state and especially can be poultry, beef, pork, lamb and even fish. Most preferred for the method of the invention, however, are poultry and fish meat.

Especially exact and aesthetically pleasing configurations of the portions of meat can be achieved when the piece of meat prior to pressing and stamping is in a frozen state and preferably at a starting temperature of −3 to −20° C.

BRIEF DESCRIPTION OF THE DRAWING

The above and other objects, features, and advantages will become more readily apparent from the following description, reference being made to the accompanying drawing in which:

FIG. 1 is a perspective view of part of a stamping press for carrying out the method of the invention;

FIG. 2 is a perspective view of a piece of meat which has been pressed to produce a portion, prior to the stamping step;

FIG. 3 is perspective view of the portion following the stamping step;

FIG. 4 is perspective view illustrating a part of the alterative method; and

FIG. 5 is a fragmentary cross sectional view illustrating the stamping portion.

SPECIFIC DESCRIPTION

FIG. 1 shows a portion of a press 10 which comprises an upper press member 11 and a lower press member 12 defining downwardly concave and upwardly concave cavities 13 and 14, respectively, and showing a ram 15 to which the upper press member can be connected. A device 16 provided between the press members allows adjustment of the spacing of the upper press member 11 from the lower press member 12 so that that spacing is reproducible in a succession of press cycles. The press thus has its upper member formed on a ram and the lower member formed as a die so that they can shape portions 17 from a piece of meat placed between these members and which have upwardly and downwardly convex surfaces 18 and 19, respectively. the press is preferably provided on a carriage and the shaping surfaces of the press members are trough shaped to impart complementary shapes to the portion 17.

The piece of the meat which is inserted into the press can be at a temperature of −3 to −20° C. and a single piece is used for each press cycle. This piece of meat has a weight which is greater and usually significantly greater than the weight of the finished portion 20 (FIG. 3) to be produced.

When the ram is lowered, a "flag" or projecting portion of excess meat 21 is expressed laterally and remains attached to the portion 17 (FIG. 2). The underside of the ram can be parallel to the edge of the bottom die.

In successive cycles, the piece of meat is always compacted precisely to the same thickness and the excess can project from all sides from the configuration of the finished meat portion.

The ram is raised and the bottom die is shifted, especially on the carriage which has been mentioned to a stamping tool such as the tool 22 shown in FIG. 5 which cuts out the portion 20 along its edge. The portions 20 thus always are of equal size and weight.

The die 12 can have a cavity in the shape of a trough, especially one with a concave rounded bottom and the ram 11 may also be provided with a concave trough whose edges are oriented with those of the die. Alternatively either the die or the ram can be formed with a trough while the other has a planar pressing surface. The meat which is pressed can be animal meat like poultry, beef, pork or lamb, or fish meat.

When the system is to be used to produce strips of meat of the same height and width (see FIG. 4), the frozen meat is placed between planar surfaces of the ram 11 and the bottom member 12, and after a piece of meat has been pressed to a uniform height as at 30 in FIG. 4, which height is the same for a succession of such pieces, the piece of meat can be cut into strips 31, especially by a stamping process. In this case as well, the ram 11 is brought to a predetermined distance from the bottom member 12 in the pressing operation. In the processes according to the invention, the lower member 12 will have a greater area than the area of the starting material so that the meat has sufficient place to yield outwardly during pressing.

As shown in FIG. 5, the stamping member 22 can have a cavity 32 in which the portion 20 is shaped and in that case the stamping tool functions as a reshaping die. The region between the stamping edges will then be deeper than the more outwardly lying region as has been shown.

I claim:

1. A method of portioning meat comprising the steps of:
   (a) pressing a frozen single piece of meat of a size greater than that of a portion to be made between an upper die and a lower die defining between them the shape and dimensions of a predetermined meat portion by relatively displacing the dies in a press with said piece of meat between them until a predetermined exact spacing between the dies is obtained and a portion is shaped in said piece of meat;
   (b) thereafter cutting out the meat from the portion shaped; and
   (c) repeating steps (a) and (b) to produce a multiplicity of meat portions of substantially identical shape and size by maintaining said exact spacing the same for a given series of meat portions.

2. The method defined in claim 1 wherein the lower die has a trough shape.

3. The method defined in claim 1 wherein said lower die has a greater area than an area covered by said piece of meat.

4. The method defined in claim 1 wherein the underside of said upper die forms the underside of a ram of the press and has the configuration of a trough.

5. The method defined in claim 4 wherein the lower die has a trough shape and the edges of said troughs register with one another.

6. The method defined in claim 1 wherein each of said portions is made from only a single piece of meat.

7. The method defined in claim 1 wherein the excess meat is cut away in step (b) by stamping.

8. The method defined in claim 7 wherein during stamping a new shape is imparted to the respective portions.

9. The method defined in claim 7 wherein the meat is poultry or fish meat.

10. The method defined in claim 7 wherein the meat is frozen before, during and after shaping of said portions and the stamping is effected in a frozen state of the meat.

11. The method defined in claim 7 wherein in step (a) the meat is at a starting temperature of −3° C. to −20° C.

12. A method of portioning meat comprising the steps of:
 (a) pressing a frozen single piece of meat of a size greater than that of a portion to be made between an upper die and a lower die defining between them the shape and dimensions of a predetermined meat portion by relatively displacing the dies in a press with said piece of meat between them until a predetermined exact spacing between the dies is obtained, thereby forming a layer of meat of a predetermined thickness and defining said portions therein;
 (b) thereafter cutting from said layer of meat strips of the same or different widths to produce strip-shaped portions; and
 (c) repeating steps (a) and (b) to produce a multiplicity of meat portions of substantially identical thickness by maintaining said exact spacing the same for a given series of meat portions.

13. The method defined in claim 12 wherein the cutting in step (b) is effected by stamping.

14. The method defined in claim 13 wherein during stamping a new shape is imparted to the respective portions.

15. The method defined in claim 13 wherein the meat is poultry or fish meat.

16. The method defined in claim 13 wherein the meat is frozen before, during and after shaping of said portions and the stamping is effected in a frozen state of the meat.

17. The method defined in claim 13 wherein in step (a) the meat is at a starting temperature of −3° C. to −20° C.

* * * * *